United States Patent [19]

Gilbert

[11] Patent Number: 5,731,996
[45] Date of Patent: Mar. 24, 1998

[54] DIPOLE MOMENT DETECTOR AND LOCALIZER

[75] Inventor: Harold C. Gilbert, Placentia, Calif.

[73] Assignee: Hughes Electronics, Los Angeles, Calif.

[21] Appl. No.: 611,291

[22] Filed: Mar. 5, 1996

[51] Int. Cl.$^6$ .............................. G01C 21/00; G01B 7/00
[52] U.S. Cl. ............... 364/559; 324/207.13; 324/207.14
[58] Field of Search ..................... 364/449, 559, 364/516, 571.02, 556, 561, 448; 324/207.11, 207.22, 207.23, 207.26, 243, 207.13, 207.14, 207.44

[56] References Cited

U.S. PATENT DOCUMENTS

| | | | |
|---|---|---|---|
| 5,008,622 | 4/1991 | Overton, Jr. et al. | 324/248 |
| 5,239,474 | 8/1993 | Eaton, Jr. et al. | 364/559 |
| 5,264,793 | 11/1993 | Lo et al. | 324/207.22 |
| 5,331,578 | 7/1994 | Stieler | 364/571.02 |
| 5,337,259 | 8/1994 | Breed | 364/559 |
| 5,387,863 | 2/1995 | Lo et al. | 324/207.13 |
| 5,558,091 | 9/1996 | Acker et al. | 324/207.11 |

OTHER PUBLICATIONS

Keiichi Mori, "Application of Weight Functions to the Magnetic Localization of an Object", printed in the IEEE Transactions on Magnetics 25 (1989) May, No. 3, New York, U.S., pp. 2726–2731.

*Primary Examiner*—James F. Trammell
*Assistant Examiner*—Bryan Bui
*Attorney, Agent, or Firm*—G. S. Grunebach; M. W. Sales; W. K. Denson-Low

[57] ABSTRACT

A processing method and apparatus that process magnetometer data derived from an array of magnetometer sensors and outputs the position or location of a magnetic dipole. In the method and apparatus, (a) a set of actual magnetic field measurements of a magnetic dipole is collected using the array of magnetic sensors. Then (b), a location for the magnetic dipole is hypothesized. Then (c), a set of estimated magnetic field measurements is determined that would be formed by a magnetic dipole at the hypothesized location. Then (d), the actual magnetic field measurements are compared with the estimated magnetic field measurements. Steps (b) through (d) are repeated for all hypothesized locations within the detection range of the array of magnetic sensors. The position or location of the dipole is displayed for viewing on a display.

16 Claims, 3 Drawing Sheets

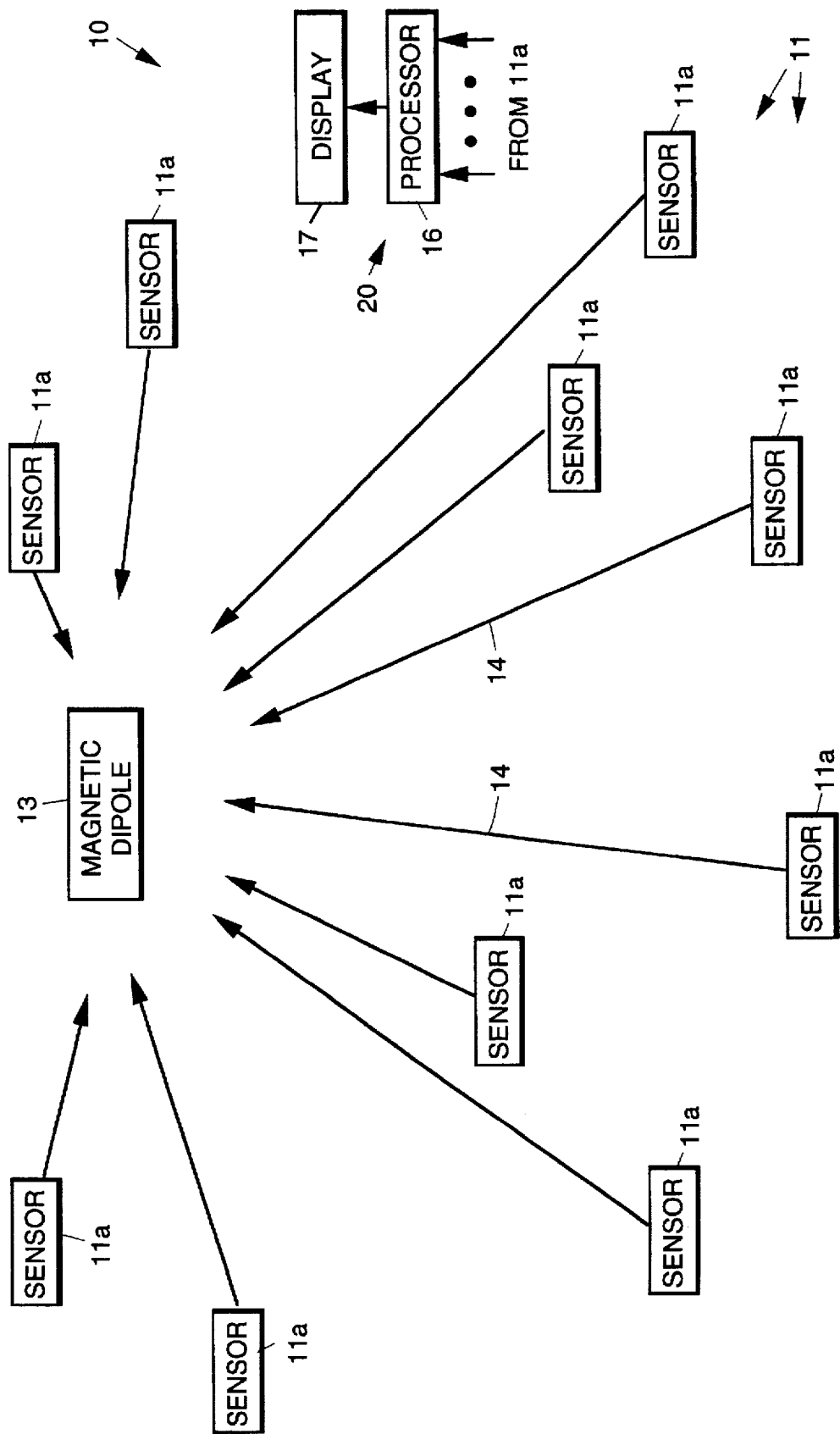

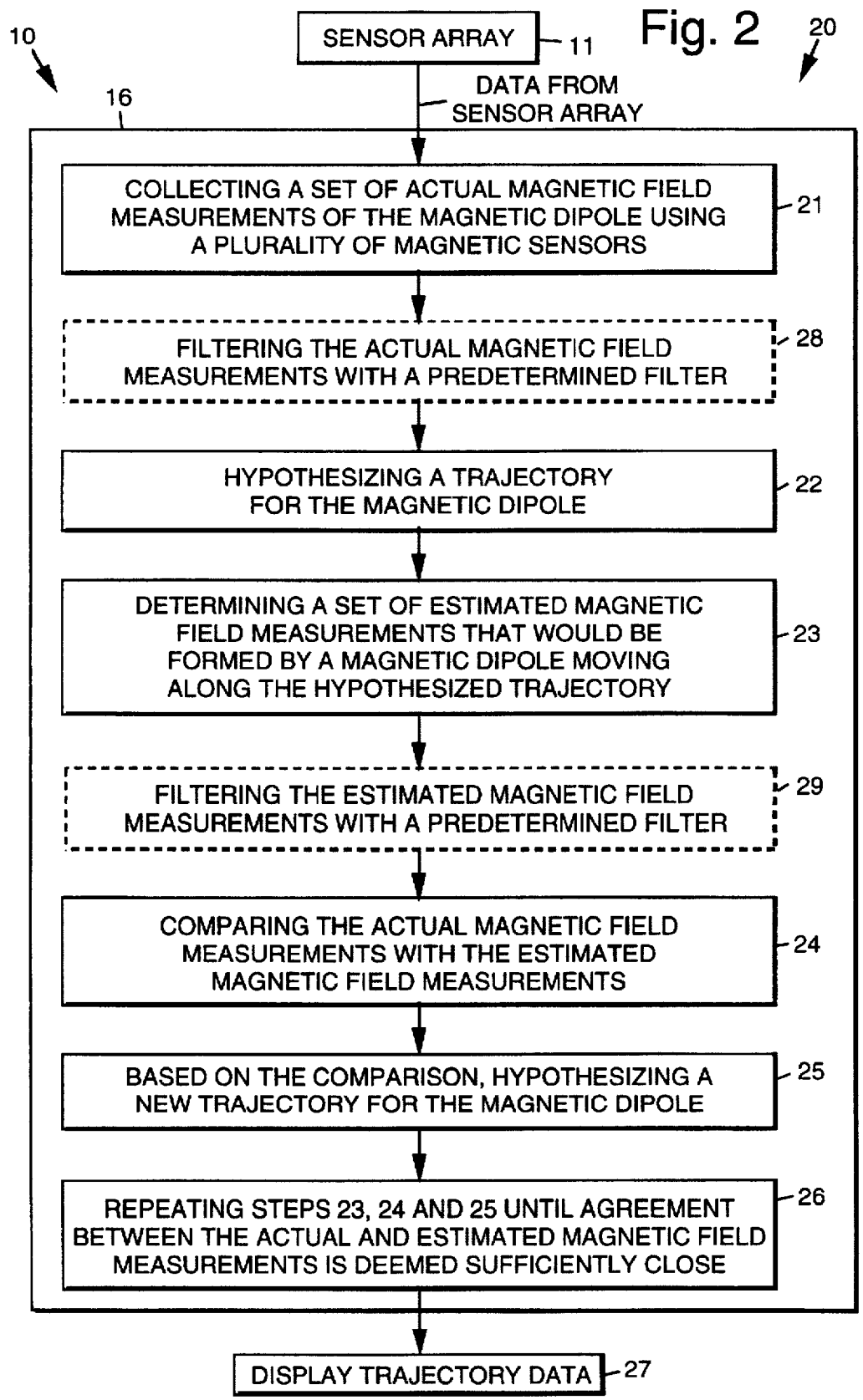

DIPOLE MOMENT DETECTOR AND LOCALIZER

BACKGROUND

The present invention relates generally to magnetometer data processing methods and apparatus for localizing magnetic dipoles, and more particularly, to a method and apparatus that employs spatial processing of magnetometer data to localize a magnetic dipole to provide the position of the dipole.

Metal objects such as firearms, automobiles, ships, and submarines, for example, have magnetic dipole moments that may be used to detect them. Historically, magnetic field sensors have been used to detect (but not locate) such objects. Magnetic dipole detectors developed by the assignee of the present invention have been used to localize objects in two ways. One implementation uses a single sensor and data is sensed over a period of time to localize the magnetic dipole. The other implementation uses an array of sensors, and a local time average of each sensor output is determined. This data is processed to determine the location of the dipole. Both techniques make an implicit assumption that the dipole of interest is relatively stationary while the measurements are being taken.

Prior art relating to the present invention is disclosed in U.S. Pat. No. 5,239,474 entitled "Dipole Moment Detection and Localization" assigned to the assignee of the present invention. This patent discloses a dipole moment detection and localization algorithm that is used to process magnetometer data to localize magnetic dipoles. The present invention provides for a processing method or algorithm that improves upon the teachings of this patent.

Accordingly, it is an objective of the present invention to provide for a method and apparatus that employs spatial processing of magnetometer data to localize a magnetic dipole to provide the position of the dipole.

SUMMARY OF THE INVENTION

To meet the above and other objectives, the present invention provides for processing methods and apparatus (which may also be referred to as a dipole moment detector and localizer, or DMDL) that processes magnetometer data derived from an array of magnetometer sensors and outputs the position of a magnetic dipole sensed and processed thereby. A physically distributed array of magnetometer sensors is used to sense the magnetic signature of a magnetic dipole. A set of magnetometer readings derived from the physically distributed array of magnetometer sensors is sampled at a predetermined time. The set of magnetometer readings is processed to estimate the location of the magnetic dipole.

The present invention implements a method that simultaneously processes magnetic field measurements taken from an array of sensors to estimate the likelihood of one or more magnetic dipole sources at particular locations in three-dimensional space. The present method and apparatus provides an estimate of the dipole moment(s) in explicit form, and an estimate of the optimal ideal measurements, in explicit form, for use in computing the likelihood factor. The present invention provides a linear estimate that enables simultaneous processing of multiple dipole sources. The present invention provides for a means for estimating the classification of complex magnetic objects. The present invention has the capability to process a randomly arranged geometric array of magnetic sensor and to process synthetic arrays along non-linear trajectories.

The present method provides for an explicit solution that reduces computational effort. In the processing method of U.S. Pat. No. 5,239,474, for example, parameters related to the dipole moment are estimated from the sensor array measurements, and these parameters are used to estimate a maximum likelihood dipole source. By estimating the maximum likelihood dipole source from the sensor array measurements explicitly, the present invention greatly reduces the amount of computation that is required.

Also, because an explicit solution is available for the dipole source, this solution may be back-substituted to obtain the ideal measurements that an optimal dipole would generate. These ideal measurements are used to compute the likelihood of the dipole estimate. By estimating the ideal sensor array measurements explicitly, the present invention reduces the amount of computation required to compute the likelihood.

The present invention provides for a linear solution that permits simultaneous processing of multiple dipole sources. In the processing method of U.S. Pat. No. 5,239,474, the solution for the dipole source is nonlinear. In the present invention, the solution for the dipole source and its ideal measurements are both linear. The advantage of a linear solution is that multiple dipole sources may be processed simultaneously for an explicit solution.

The present invention provides for a linear solution that permits classification of complex magnetic objects by magnitude and position of multiple dipoles. Using the present method, complex magnetic objects may be approximated by the linear combination of a few discrete magnetic dipole sources. Because the present invention can simultaneously process such linear combinations, complex objects and their likelihood may be explicitly estimated. This is an advantage over solving for each dipole source independently and then combining them to determine if they form a known complex object.

The ability of the present invention to process arbitrary geometries of arrays permit each configuration of magnetic sensors to be arranged for optimum function and performance. In the processing method of U.S. Pat. No. 5,239,474, the sensor arrays must be arranged in simple geometries, such as straight lines or simple arcs. The present invention places no such restrictions on geometrical arrangement and tolerates the placement of sensors anywhere in three-dimensional space. The advantage is that systems of sensor arrays may be designed to optimize the area of coverage and detection performance. Synthetic arrays are generated by taking periodic measurements from a single sensor in motion. The present invention permits processing of synthetic arrays regardless of the complexity of the geometrical motion. The advantage is that the trajectories used are not limited to straight lines and simple arcs, but that any path of motion may be processed.

In the present invention, (a) a set of actual magnetic field measurements of a magnetic dipole is collected using a plurality of magnetic sensors. Then (b), a location for the magnetic dipole is hypothesized. Then (c), a set of estimated magnetic field measurements is determined that would be formed by a magnetic dipole at the hypothesized location. Then (d), the actual magnetic field measurements are compared with the estimated magnetic field measurements. Steps (b) through (d) are repeated for all hypothesized locations within the detection range of the array of magnetic sensors.

The processing method and apparatus of the present invention provides for an improvement over the processing technique described in U.S. Pat. No. 5,239,474. The advantages of the present invention over the process disclosed in U.S. Pat. No. 5,239,474 are as follows.

In the prior process, the dipole moments and their likelihood are not derived explicitly so that a more computationally intensive matching algorithm must be used. The dipole moment solution of the prior process is nonlinear so that multiple dipoles in close proximity must be found using an iterative detection/removal scheme. Classification of complex magnetic sources can be performed only after several proximate dipole sources are characterized. The DMDL does not derive classification parameters explicitly from magnetic field measurements. The sensors used in the prior process must be arranged in relatively simple geometries, such as straight lines and simple arcs. Synthetic arrays must also comprise simple geometries. The prior process does not handle detection locations on or near the axis of the sensor array.

The processing method and apparatus of the present invention may be used with any system intended to passively detect, locate, and classify objects using their magnetic fields. The present processing method or algorithm may be employed in non-acoustic anti-submarine surveillance and warfare systems, airport ground-traffic control systems, highway traffic monitoring systems, and personal weapon detection systems, and may provide for clandestine monitoring of military activity behind enemy lines, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows magnetic dipole detection apparatus in accordance with the principles of the present invention;

FIG. 2 shows a flow diagram illustrating a processing method or algorithm in accordance with the present invention employed in the apparatus of FIG. 1.

DETAILED DESCRIPTION

Figure 3B:
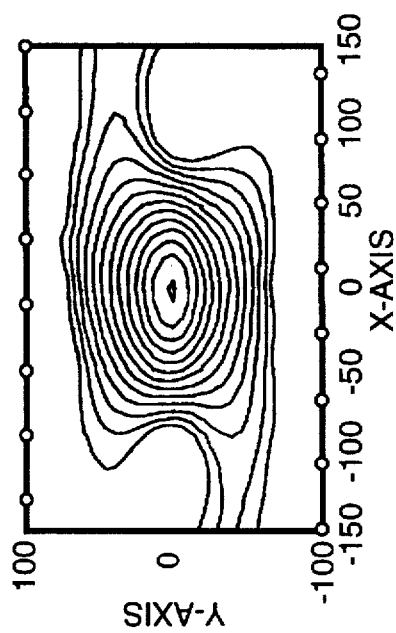
FIG. 3 shows the capability of the present invention to localize a single dipole source.

Referring to the drawing figures, FIG. 1 shows magnetic dipole detection apparatus 10 in accordance with the principles of the present invention. The magnetic dipole detection apparatus 10 comprises an arbitrarily positioned array of magnetic sensors 11 that is coupled to processing apparatus 16 that implements processing methods 20 in accordance with the present invention. The sensors 11 of the array of magnetic sensors 11 may be coupled to the processing apparatus 16 by means of hard wire coupling, an RF data link, a microwave data link, or other appropriate means. A magnetic dipole 13 (or target 13) is located within the detection range of the array of magnetic sensors 11. A plurality of arrows representing magnetic field measurements 14 are shown extending from each sensor 11a of the array of magnetic sensors 11 toward the location of the moving dipole 13. The readings from each sensor 11 comprise a set of data that are indicative of the location of the dipole 13 at a time during which the sensor data is gathered for analysis. The sensor data from the array of magnetic sensors 11 is processed in the processing apparatus 16 to generate position information regarding the dipole 13 and this data is subsequently displayed for viewing on a display 17.

FIG. 2 shows a flow diagram illustrating a processing method 20 or algorithm in accordance with the present invention employed in the apparatus 10 of FIG. 1. The processing method 20 is implemented in the processing apparatus 16 and comprises the following steps. The first step (a) involves collecting 21 a set of actual magnetic field measurements of the magnetic dipole 13 using a plurality of magnetic sensors 11. Optionally, the actual magnetic field measurements may be filtered by a predetermined filter, as shown in step 28. In the next step (b), a location for the magnetic dipole 13 is hypothesized 22. In the next step (c), a set of estimated magnetic field measurements is determined 23 that would be formed by a magnetic dipole at the hypothesized location. In the event that the actual magnetic field measurements have been filtered by the predetermined filter, the estimated magnetic field measurements are also filtered by the predetermined filter as shown in step 29. Then in the next step (d) the actual magnetic field measurements (or filtered actual measurements) are compared 24 with the estimated magnetic field measurements (or filtered estimated measurements). Steps b) through d) are repeated 26 for all hypothesized locations within the detection range of the array of magnetic sensors 11. The position of the dipole 13 is displayed 27 for viewing on a display 17.

The spatial and temporal processing performed by the present invention is mathematically described as follows. The magnetic field at a point in space due to the presence of the magnetic dipole 13 is given by the basic equation:

$$\underline{B} = 1/r^5 [3(\underline{m} \cdot \underline{r})\underline{r} - r^2 \underline{m}] \tag{1}$$

where: $\underline{B}$ is the magnetic field vector, given by:

$$\underline{B} = B_x \underline{i} + B_y \underline{j} + B_z \underline{k} \tag{2}$$

$\underline{m}$ is the dipole moment vector, given by:

$$\underline{m} = m_x \underline{i} + m_y \underline{j} + m_z \underline{k} \tag{3}$$

$\underline{r}$ is the position vector, given by:

$$\underline{r} = r_x \underline{i} + r_y \underline{j} + r_z \underline{k} \tag{4}$$

r(t) is the position in the magnetic field with respect to the position of the dipole moment, given by:

$$\underline{r} = \underline{r}_s - \underline{r}_d(t) \tag{5}$$

$r_s$ is the position at which the magnetic field equals $\underline{B}$, and $\underline{r}_d$ (t) is the location of dipole moment.

After substituting the vector components and simplifying, the basic equation becomes:

$$\underline{B} = \frac{1}{r^5} \begin{vmatrix} (2r_x^2 - r_y^2 - r_z^2)m_x + (3r_x r_y)m_y + (3r_x r_z)m_z \\ (3r_x r_y)m_x + (2r_y^2 - r_x^2 - r_z^2)m_y + (3r_y r_z)m_z \\ (3r_x r_z)m_x + (3r_y r_z)m_y + (2r_z^2 - r_x^2 - r_y^2)m_z \end{vmatrix} \tag{6}$$

where:

$$r^5 = (r_x^2 + r_y^2 + r_z^2)^{5/2} \tag{7}$$

The position matrix may be defined as:

$$[R] = \frac{1}{r^5} = \begin{vmatrix} 2r_x^2 - r_y^2 - r_z^2 & 3r_xr_y & 3r_xr_z \\ 3r_xr_y & 2r_y^2 - r_x^2 - r_z^2 & 3r_yr_z \\ 3r_xr_z & 3r_yr_z & 2r_z^2 - r_x^2 - r_y^2 \end{vmatrix} \quad [8]$$

Then, by substitution:

$$\underline{B} = [R]\underline{m} \quad [9]$$

The position matrix, R, is a function of the relative positions of the magnetic dipole 13 and the point in space where the magnetic field equals $\underline{B}$.

Assume that the array of magnetic sensors 11 is arbitrarily arranged in three-dimensional space such as is shown in FIG. 1. Each sensor of the array 11 measures the three components of the local magnetic field. The sensors of the array 11 are oriented so that their respective axes are parallel to each other.

Define the measurements of the magnetic field at the array of sensors 11 by a composite vector $$\underline{B}_A = \begin{vmatrix} \underline{B}_1 \\ \underline{B}_2 \\ \ldots \\ \underline{B}_N \end{vmatrix} \quad [10]$$

where N is the number of sensors in the array 11.

The position mat fix for the array 11 may be defined by the composite matrix:

$$\underline{R}_A = \begin{vmatrix} R_1 \\ R_2 \\ \ldots \\ R_N \end{vmatrix} \quad [11]$$

Then for the array, the expansion of equation 9 becomes:

$$\underline{B}_A = [R_A]\underline{m} \quad [12]$$

If $\underline{B}_A$ is a set of measurements representing the field of a single magnetic dipole 13, then solving equation 12 for m provides a maximum likelihood estimate of the magnetic dipole vector. At this point, assume that other significant magnetic sources, such as the earth's magnetic field and local geomagnetic distortions, have been subtracted from the measurements. Define the pseudo-inverse of the array position matrix as:

$$[\hat{R}_A] = [[R_A]^T[R_A]]^{-1}[R_A]^T \quad [13]$$

Then the estimated dipole vector is:

$$\underline{m}_{est} = [\hat{R}_A]\underline{B}_A \quad [14]$$

The correlation coefficient will now be derived. The goodness of the estimated dipole vector of the magnetic dipole 13 is evaluated as the correlation coefficient between actual sensor measurements and ideal sensor measurements derived from the estimated dipole vector. Define the set of ideal measurements as $$\underline{B}_I = [R_A]\underline{m}_{est} \quad [15]$$

By subtracting the mean from the sets of actual and ideal measurements, zero-mean vectors are obtained that are given by:

$$\underline{B}_{A0} = B_A - \frac{1}{N}\Sigma\,\underline{B}_A, \quad [16]$$

and $$\underline{B}_{I0} = B_I - \frac{1}{N}\Sigma\,\underline{B}_I. \quad [17]$$

Then, the correlation coefficient is:

$$\rho = \frac{\underline{B}_{A0}^T \underline{B}_{I0}}{\sqrt{(\underline{B}_{A0}^T\underline{B}_{A0})(\underline{B}_{I0}^T\underline{B}_{I0})}} \quad [18]$$

The estimate of measurements will now be discussed. $\underline{B}_I$ is an estimate of the realizable measurements at the sensors that best fits the actual sensor measurements $\underline{B}_A$. If the expression for $\underline{m}_{est}$ is substituted into the equation for $\underline{B}_I$, a direct estimate of the ideal measurements is obtained:

$$\underline{B}_I = R_A[\hat{R}_A]\underline{B}_A \quad [19]$$

Define the measurement estimation matrix:

$$S = R_A[\hat{R}_A] \quad [20]$$

which, in expanded form is:

$$S = [R_A][[R_A]^T[R_A]]^{-1}[R_A]^T \quad [21]$$

Then, substituting equation 20 into equation 19 yields:

$$\underline{B}_I = [S]\underline{B}_A \quad [22]$$

S is a function of sensor positions and hypothesized dipole position. It has the properties of being symmetrical and optimal in that:

$$[S] = [S]^T \quad [23]$$

and $$[S] = [S]^2 \quad [24]$$

Equation 24 shows that the estimator S, when applied to an ideal set of measurements, $B_I$, reproduces the set of ideal measurements as an optimal estimate.

In the case of multiple dipoles 13, the linear form of the dipole estimator equation simplifies the simultaneous processing of data derived from the multiple dipoles 13. Assume two magnetic dipoles 13, $\underline{m}_1$ and $\underline{m}_2$, at two different positions characterized by $R_1$ and $R_2$. Assume that the same array of sensors 11 is used to measure both $\underline{m}_1$ and $\underline{m}_2$. Because equation 9 is linear, and because magnetic fields may be linearly summed, the effects of the two dipoles 13 on the sensor measurements may be linearly summed:

$$B = [R_1]\underline{m}_1 + [R_2]\underline{m}_2 \quad [25]$$

which may be simplified to:

$$\underline{B} = |R_1 \ R_2| \begin{vmatrix} \underline{m_1} \\ \underline{m_2} \end{vmatrix}. \quad [26]$$

Equation 26 shows that multiple dipoles 13 at hypothesized locations may be estimated simultaneously from one set of measurements. In the general case, define:

$$\underline{m_T} = \begin{vmatrix} \underline{m_1} \\ \underline{m_2} \\ \ldots \\ \underline{m_M} \end{vmatrix} \quad [27]$$

where M is the numbers of dipoles 13, and also define:

$$[R_T] = |R_1 R_2 \ldots R_m| \quad [28].$$

Then equation 29 becomes:

$$\underline{B} = [R_T]\underline{m_T} \quad [29].$$

This leads to the simultaneous estimation of the locations of M dipole sources:

$$\underline{m_{T_{est}}} = [\hat{R}_T]\underline{B} \quad [30]$$

where $\hat{R}_T$ is the pseudo-inverse of $R_T$ as in equation 13.

Equation 30 indicates a means of classifying complex magnetic sources, that is, single objects which generate magnetic fields that are not characterized as a single dipole. Such objects may usually be modeled as a set of simple dipoles. If the geometric arrangement of these dipole sources is known a priori, then $R_T$ may be computed at each point of interest in advance to estimate and correlate the complex object. This is the case when the primary sources of magnetic field within the object appear as dipoles at fixed geometric positions.

In a more general sense, a set of hypothetical dipoles in a regular geometric pattern (for example four dipoles in a diamond pattern) may be used to approximate any large complex object. This leads to a single $R_T$ for computing any object, resulting in a set of $\underline{m_{T_{est}}}$ (twelve vector components for the diamond pattern) parameters which can be compared to sets of parameters for known objects to find a best match. The method provides two correlation coefficients one for how well the parameters match the measured values (detection) and one for how well the parameters match a known object (classification).

Figure 3D:
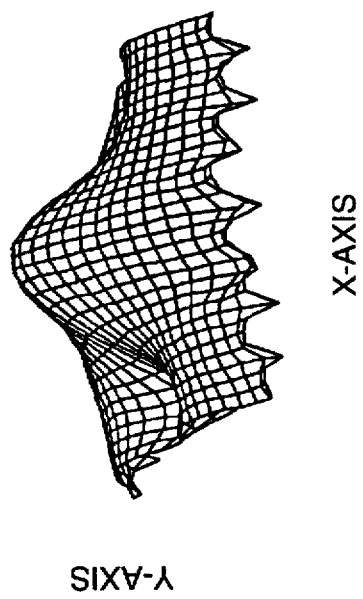
Figure 3A:
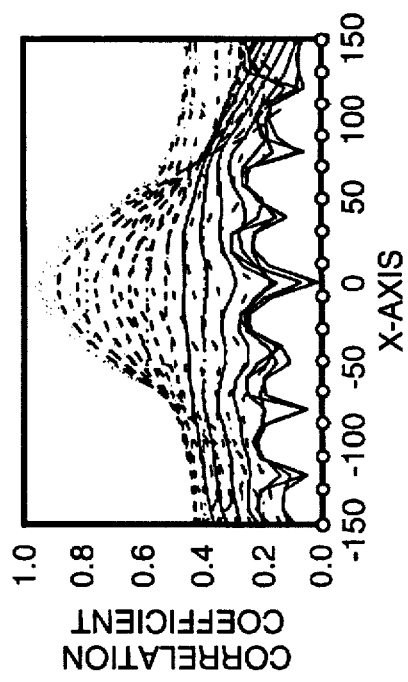
Figure 3C:
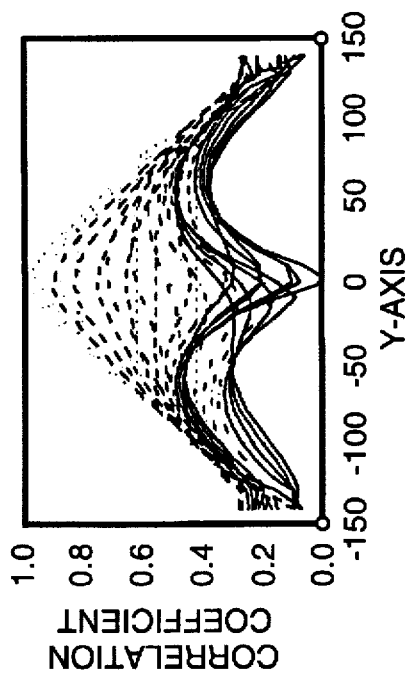

FIG. 3 demonstrates the single dipole source capability of the present invention. The arrangement has twenty magnetic sensors 11 in two rows of ten, spaced 300 feet apart. The sensors 11 are spaced 40 feet apart within each row and the rows are staggered. The dipole 13 is four million gamma-feet located at the center of the array. An optimal dipole 13 is estimated using equation 14 at each of 900 grid points, spaced 10 feet apart, within the area covered by the array. Each hypothesized dipole 13 is then correlated with the actual sensor measurements using equation 18, and these correlation coefficients are plotted in the figure. Noise of 0.5 gamma RMS is added to the sensor measurements, which are integrated over ten time samples. The correlation coefficient reaches a peak value of 0.96 at the actual source location, and falls off rapidly at all other locations.

Thus, improved methods and apparatus that employ spatial processing of magnetometer data to localize magnetic dipoles and output trajectory data regarding the dipole have been disclosed. It is to be understood that the described embodiments are merely illustrative of some of the many specific embodiments which represent applications of the principles of the present invention. Clearly, numerous and varied other arrangements may be readily devised by those skilled in the art without departing from the scope of the invention.

What is claimed is:

1. A method of detecting and localizing a magnetic dipole using an array of spatially distributed magnetic sensors, said method comprising the steps of:

a) collecting a set of actual magnetic field measurements of a magnetic dipole using a plurality of magnetic sensors;

b) storing position matrices corresponding to hypothesized locations of the magnetic dipole relative to the array of sensors;

c) estimating the orientation and magnitude of the dipole from the magnetic field measurements using an electromagnetic moment equation that generates a minimum least-squares estimate that minimizes the sum of squared errors between the actual magnetic field measurements and magnetic field measurements that would be generated by a dipole having an optimal orientation and magnitude;

d) computing expected magnetic field measurements that would be generated at the sensors by the dipole having the optimal orientation and magnitude;

e) comparing the actual magnetic field measurements with the expected magnetic field measurements;

f) repeating steps b) through e) for all hypothesized locations within the detection range of the array of magnetic sensors to detect and localize the magnetic dipole.

2. The method of claim 1 further comprising the step of displaying the location data.

3. The method of claim 1 wherein the step of repeating steps b) through e) for all hypothesized locations within the detection range of the array of magnetic sensors comprises the steps of:

correlating the measured magnetic field values with each of the estimated magnetic field values for the array of sensors, by multiplying the estimated magnetic field values with the measured magnetic field values and summing the results over the array of sensors; and if one of the resulting correlations has a significantly larger value than the others and if it is greater than a predetermined threshold, declaring a detection for the location corresponding to the calculated values that resulted in the larger correlation value.

4. The method of claim 3 further comprising the step of displaying the location data.

5. A method of detecting and localizing a magnetic dipole using an array of spatially distributed magnetic sensors, said method comprising the steps of:

a) collecting a set of actual magnetic field measurements of a magnetic dipole using a plurality of magnetic sensors;

b) filtering the actual magnetic field measurements using a predetermined filter;

c) storing position matrices corresponding to hypothesized locations of the magnetic dipole relative to the array of sensors;

d) estimating the orientation and magnitude of the dipole from the magnetic field measurements using an electromagnetic moment equation that generates a minimum least-squares estimate that minimizes the sum of squared errors between the actual magnetic field measurements and magnetic field measurements that would be generated by a dipole having an optimal orientation and magnitude;

e) computing expected magnetic field measurements that would be generated at the sensors by the dipole having the optimal orientation and magnitude;

f) filtering the expected magnetic field measurements using the predetermined filter;

g) comparing the actual magnetic field measurements with the expected magnetic field measurements; and h) repeating steps c) through g) for all hypothesized locations within the detection range of the array of magnetic sensors to detect and localize the magnetic dipole.

6. The method of claim 5 further comprising the step of displaying the location data.

7. Apparatus for detecting and localizing a magnetic dipole comprising:

an array of magnetic sensors;

processing means coupled to the array of magnetic sensors, for storing position matrices corresponding to hypothesized locations of the magnetic dipole relative to the array of sensors, for estimating magnetic field values comprising the orientation and magnitude of the dipole at said plurality of hypothesized locations from magnetic field measurements using an electromagnetic moment equation that generates a minimum least-squares estimate that minimizes the sum of squared errors between the actual magnetic field measurements and magnetic field measurements that would be generated by a dipole having an optimal orientation and magnitude, for collecting magnetic field signals indicative of the magnetic field measured at each of the sensors in the presence of the magnetic dipole that is to be detected to provide measured magnetic field values, for removing spatial and temporal variations in the magnetic field measured at each of the sensors by temporally and spatially filtering the measured magnetic field signals, for correlating the measured magnetic field values with each of the estimated magnetic field values by multiplying the estimated magnetic field values with the measured magnetic field values and summing the results over the array of sensors, for identifying the location of the dipole if one of the correlations has a significantly larger value than the others and if it is greater than a predetermined threshold, and if the trajectory location of the dipole corresponds to the location represented by the measured magnetic field signals that produced in the significantly larger value; and display means for displaying the location of the identified dipole.

8. The method of claim 1 wherein the step of estimating the orientation and magnitude of the dipole comprises the step of:

simultaneously estimating the orientation and magnitude of multiple dipoles to simultaneously detect and localize a plurality of discrete magnetic dipoles.

9. The method of claim 8 further comprising the step of:

comparing the magnitudes and positions of the plurality of discrete magnetic dipoles to predetermined geometric patterns of dipoles that correspond to known complex magnetic objects to classify the plurality of discrete magnetic dipoles as a particular magnetic object.

10. The method of claim 1 wherein the plurality of magnetic sensors comprises a three dimensional array having an arbitrary number of sensors, each of which is positioned in an arbitrary orientation at arbitrary points in space.

11. The method of claim 5 wherein the step of estimating the orientation and magnitude of the dipole comprises the step of:

simultaneously estimating the orientation and magnitude of multiple dipoles to simultaneously detect and localize a plurality of discrete magnetic dipoles.

12. The method of claim 11 further comprising the step of:

comparing the magnitudes and positions of the plurality of discrete magnetic dipoles to predetermined geometric patterns of dipoles that correspond to known complex magnetic objects to classify the plurality of discrete magnetic dipoles as a particular magnetic object.

13. The method of claim 5 wherein the plurality of magnetic sensors comprises a three dimensional array having an arbitrary number of sensors, each of which is positioned in an arbitrary orientation at arbitrary points in space.

14. The apparatus of claim 7 wherein the processing means further comprises:

means for simultaneously estimating the orientation and magnitude of multiple dipoles to simultaneously detect and localize a plurality of discrete magnetic dipoles.

15. The apparatus of claim 14 wherein the processing means further comprises:

means for comparing the magnitudes and positions of the plurality of discrete magnetic dipoles to predetermined geometric patterns of dipoles that correspond to known complex magnetic objects to classify the plurality of discrete magnetic dipoles as a particular magnetic object.

16. The apparatus of claim 7 wherein the plurality of magnetic sensors comprises a three dimensional array having an arbitrary number of sensors, each of which is positioned in an arbitrary orientation at arbitrary points in space.

* * * * *